United States Patent [19]

Cain et al.

[11] Patent Number: 4,867,775
[45] Date of Patent: Sep. 19, 1989

[54] METHOD AND APPARATUS FOR COATING OPTICAL FIBERS

[75] Inventors: Michael B. Cain, Corning; Rengan Kannabiran, Big Flats; Eric H. Urruti, Corning, all of N.Y.

[73] Assignee: Corning Incorporated, Corning, N.Y.

[21] Appl. No.: 229,444

[22] Filed: Aug. 8, 1988

[51] Int. Cl.$^4$ .......................................... C03B 37/025
[52] U.S. Cl. ..................... 65/3.43; 65/3.41; 65/11.1; 118/689; 118/690; 427/163
[58] Field of Search .................. 65/3.4, 3.41, 3.43, 65/3.44, 11.1; 427/163; 118/689, 690

[56] References Cited

U.S. PATENT DOCUMENTS

| 4,388,093 | 6/1983 | Kimura et al. | 65/3.43 X |
| 4,439,467 | 3/1984 | Kassahun et al. | 427/163 |
| 4,531,959 | 7/1985 | Kar et al. | 65/3.11 |

FOREIGN PATENT DOCUMENTS 56-069238  6/1981  Japan .

OTHER PUBLICATIONS

Chemical Abstracts Selects: Optical and Photosensitive Materials, Issue 18 (1987) Abstract 107:82650b, "Apparatus for Resin-Coating Optical Fibers".

Primary Examiner—Arthur Kellogg
Attorney, Agent, or Firm—Kees van der Sterre

[57] ABSTRACT

A method and apparatus for the rapid on-line coating of optical fibers with two-package polymer coating systems utilizing conventional liquid fiber coaters is described. The A and B parts of the two-package coating system are continuously combined and mixed together to form a polymerizable coating liquid as the fiber is drawn. This polymerizable coating liquid is continuously delivered to the liquid coater at a rate corresponding to the rate at which it is applied to the fiber, suitable control of the delivery rate being achieved via the use of a feedback signal to the coating liquid delivery system from, e.g., the fiber coater.

24 Claims, 1 Drawing Sheet

METHOD AND APPARATUS FOR COATING OPTICAL FIBERS

BACKGROUND OF THE INVENTION

The present invention relates to the application of polymer coating materials to glass optical fibers, and particularly relates to a new method and new apparatus for applying such coatings to such fibers.

As is well known, polymer and other coatings are customarily applied to glass optical fibers used for optical communications applications in order to protect the fibers from mechanical abrasion which can significantly weaken them. Glass fibers are quite strong as first drawn from a glass melt or preform, but can be drastically weakened by even slight casual contact with solid surfaces, due to the development of tiny flaws on the surfaces of the glass upon such contact. Hence protective coatings are conventionally applied to glass optical fibers immediately after they are drawn, and in any case before they are collected on a winding reel or otherwise brought into contact with other solid materials or each other.

There are at present several commercial processes for the application of polymer coatings to glass optical fibers. Among these are processes involving the application to the fiber of a UV-curable acrylate polymer which can be cured at very high speeds by irradiating the acrylate-coated fiber with intense ultraviolet radiation. Disadvantages of these processes include the relatively high cost of presently available UV-cured acrylate formulations and somewhat less than optimum resistance to thermal deterioration, particularly in certain high-temperature use environments.

More durable coating systems also in commercial use for the production of coated optical fibers comprise the RTV silicone polymers. These materials typically exhibit greater resistance to thermal degradation than UV-curable acrylate polymers, but are generally cured by heating rather than by irradiation. For this reason silicone coatings can not easily be applied at the high fiber drawing rates desired for large-scale commercial optical fiber production.

Another disadvantage associated with many of the commercial coating systems, particularly including two-part or chemically cured systems such as the silicone systems, is the relatively short pot life of the coating mixture. The mixed components of these systems are subject to polymerization even at ambient temperatures, and begin to show gelation accompanied by an increase in viscosity soon after mixing. Thus in conventional commercial practice, after thorough mixing and degasification of the mixture to remove air bubbles, the mixture is cooled during intermediate storage and subsequent application to the fiber.

Even with cooling, large drifts in viscosity tending to produce drifts in the diameter of the coated fiber continue to occur, in essence limiting the length of the manufacturing run time. For example, one commercially used silicone elastomer coating system doubles in viscosity at 25° C. within approximately 2 hours. Heating the resin to reduce the viscosity is not effective since heat accelerates the curing reaction leading to gelation. And ultimately, any material in the coating system which is not applied to the fiber during the draw run must be discarded.

The combined requirements of long pot life and rapid curing characteristics after application to the fiber have largely limited the choices of polymer coating materials which can be applied to optical fibers. Hence while alternative processes such as extrusion have been used to apply stable thermoplastics to optical fibers, such processes have typically been limited to the application of jacketing or overcoating polymers to precoated fibers. Two-package plastic polymer systems other than the silicones have not been commercially used to any large extent because of the difficulty of meeting these requirements.

It is an object of the present invention to provide a method which can be used to coat optical fibers with a variety of polymer systems and which is not limited by the pot life of the selected resin system.

It is further object of the invention to provide a method for coating optical fibers which can employ two-package polymer systems exhibiting very rapid curing characteristics.

It is a further object of the invention to provide apparatus for the manufacture of coated optical fibers which permits the use, for such manufacture, of coating systems exhibiting improved properties such as rapid curing and lower cost.

It is a further object of the invention to provide a method and apparatus for coating optical fibers which reduce the amount of waste material attributable to short pot life in the coating mixture to be applied.

Other objects and advantages of the invention will become apparent from the following description thereof.

SUMMARY OF THE INVENTION

The present invention is directed to an improved method for applying polymer coatings to glass optical waveguide fibers by the application of a polymerizable coating liquid to the optical fiber as the fiber is drawn from a glass melt or preform, and before the optical fiber is collected by winding or other means such that it comes into contact with solid surfaces. Conventionally these coating methods involve the use of a liquid coater such as a coating wick or coating die from which a polymerizable coating liquid is applied to the fiber surface immediately after it is drawn. In the art, such methods are characterized as coating "on the draw."

The improved method of the invention is applicable to essentially any process wherein the polymerizable coating liquid to be applied to the fiber "on the draw" comprises a mixture of at least first and second liquid components. These may be two liquid resins, a resin and a curing catalyst therefor, a resin and a modifier therefor such as a dye, or another like combination of liquids.

In accordance with the method, the first and second liquid components are continuously mixed under controlled conditions and thereafter directly supplied to the liquid coater as a homogeneous liquid blend. This blend, constituting the polymerizable coating liquid, is then immediately applied to the fiber from the coater.

The method of the invention is particularly useful with two-package coating systems wherein the mixture of two components exhibits rapid gelling and cure characteristics. Because the first and second liquid components are kept separate until just prior to application to the fiber, problems of short pot life and/or coating liquid instability are avoided and the coating of two-package systems at low viscosity is achieved.

In another aspect, the invention comprises improved apparatus for the manufacture of polymer-coated glass optical fibers. Conventionally, such apparatus includes drawing means for drawing glass optical fiber from a glass melt or preform and a liquid coater positioned between the drawing means and the glass melt or preform for applying to the surface of the fiber as it is drawn a polymerizable coating liquid present in or supplied to the coater. The coating liquid may be supplied to the coater from a separate liquid supply system, which may comprise elaborate storage and delivery means or which may consist simply of a reservoir of coating liquid. Most conventional systems further include curing means positioned adjacent the liquid coater for curing the polymerizable coating liquid after it is applied to surface of the fiber.

In accordance with the invention, the apparatus includes a supply system for the polymerizable coating liquid which comprises a liquid mixer having a liquid output connected to a polymerizable coating liquid input at the coater. The liquid mixer comprises liquid input means for at least first and second liquid polymer components to be combined to form the polymerizable coating liquid, and operates to continuously combine the first and second liquid polymer components with thorough mixing prior to supplying them to the liquid output for transport to the coater.

Connected to the liquid input means for the mixer are first and second metered liquid supply means for the first and second liquid polymer components, respectively. The liquid supply means operate to continuously supply metered proportions of the first and second polymer components via liquid conduits therefor to the input means for the liquid mixer. The metered liquid supply means normally include several elements for liquid flow control which may include metering pumps, control valves, programmable electronic valve and/or pump controllers, and/or other devices as hereinafter more fully described.

At least one of the metered liquid supply means includes a feedback signal input means for receiving a control signal, the control signal being used for controlling the rate of liquid supply therethrough. The control signal for the feedback signal input or inputs is a depletion signal generated by sensing means hereinafter described, located at or downstream of the metered liquid supply means and varying in accordance with the depletion or depletion rate of mixed polymerizable coating liquid from the coating liquid supply system.

The supply system further includes sensing means, positioned at or between at least one of the metered liquid supply means and the liquid coater, for sensing the depletion of polymerizable coating liquid from the supply system as optical fiber is drawn through the coater and coated. The sensing means are positioned on the flow path for at least one of the liquids or liquid components to be applied to the fiber, and are in sensing contact therewith, whether by physical contact, electrical contact, optical contact, or similar means.

The sensing means include a signal output which is adapted to generate the aforementioned depletion signal as coating liquid is deposited from the coater onto the surface of the optical fiber. The sensor may sense liquid level, pressure, coating thickness, or other parameter from which the rate of application and/or the depletion of polymerizable coating liquid from the supply system can be measured or calculated and a corresponding depletion signal generated.

Finally, the apparatus comprises signal transmission means for conveying the depletion signal from the signal output of the sensing means to the feedback signal input means on the first and/or second metered liquid supply means. As noted, this depletion signal is used by the metered liquid supply means to control the flow of liquid polymer components to the liquid mixer. In this way, the metered liquid supply means and mixer operate to continuously supply coating liquid to the coater as liquid is applied by the coater to the optical fiber being drawn.

By virtue of the use of separate liquid supply means, two-part polymer systems which are unstable and/or exhibit rapid gelling after mixing can be employed for coating optical fibers. Hence the dwell time in the liquid flow path from the mixer output to the coater may be as short as desired. Further, the system largely eliminates the need for the degassing of the mixed coating liquid, and provides for high speed application since the curing rate of the mixture can be chemically adjusted to very high levels. Thus more rapid curing of the applied coating can be achieved without the need for larger curing systems or longer coated fiber dwell time in the curing environment.

DESCRIPTION OF THE DRAWING

The invention may be further understood by reference to the drawing wherein.

DETAILED DESCRIPTION

Figure 1:
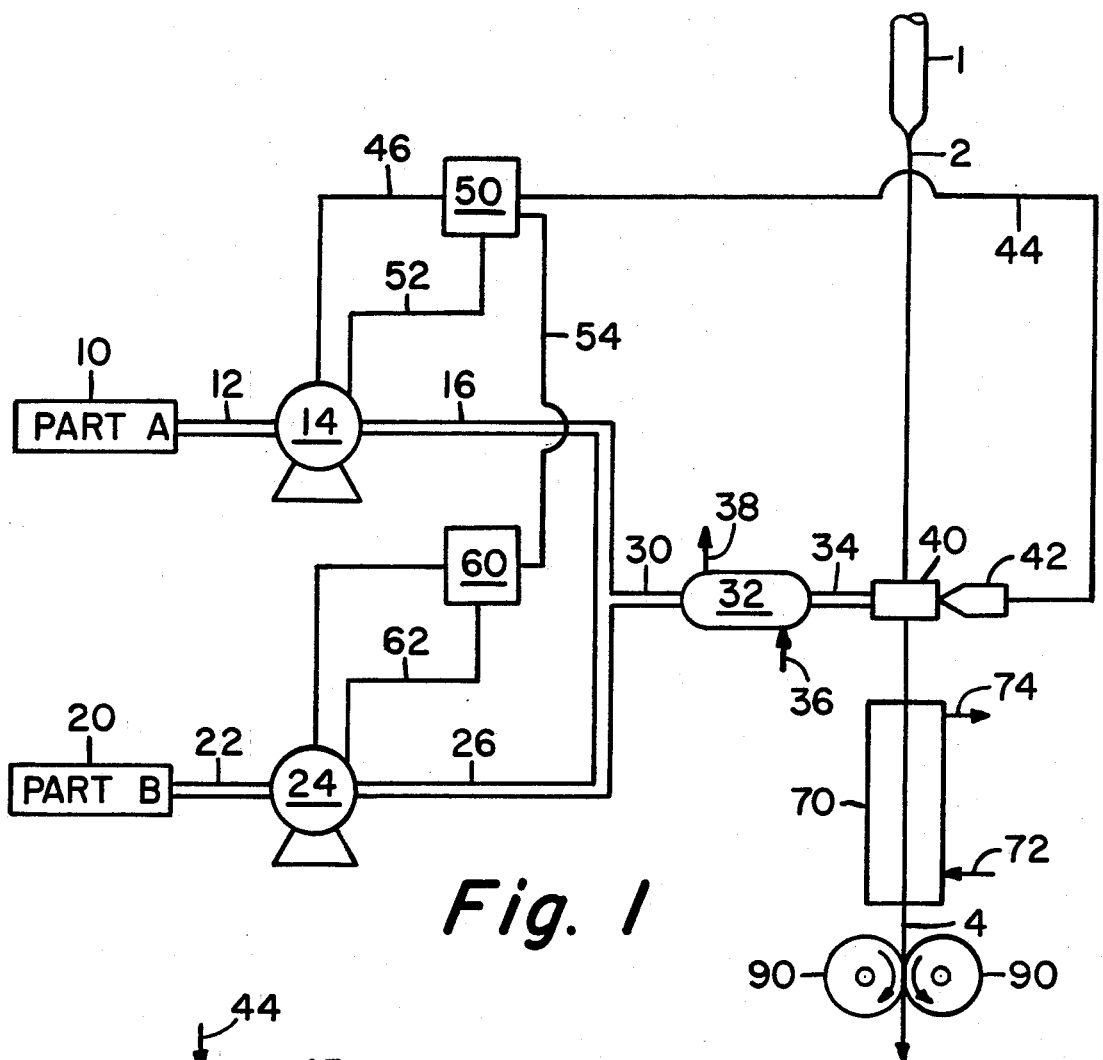
FIG. 1 consists of a schematic illustration of apparatus for the manufacture for coated optical fibers in accordance with the invention.

In terms of rapidity of cure it appears difficult to surpass the performance of the UV-curable resins which have been developed for high-speed coating applications such as optical fibers. Hence these resins can be applied and cured at very high rates (e.g., at fiber drawing speeds of 20 meters per second or more), and the coated fibers are durable and easy to handle. However, the ultimate properties of these coatings may not be as desirable as other resin systems from the standpoint of water absorption, thermal stability, and freedom from retained polymerization byproducts. Also, as earlier indicated, the cost of these resins is a factor to be considered.

Thermal (chemical) cure systems such as the two-part silicone systems presently used for optical fiber coatings can offer advantages in terms of cured coating properties, but in the past have not offered the option of high-speed coating because of the difficulty of curing these coatings at the high fiber drawing rates preferred for high volume fiber production. Thus commercially attractive fiber drawing speeds are presently in the range of at least 10 meters and preferably at least 20 meters per second.

The present invention secures the advantages of high optical fiber coating and curing speeds for chemically cured liquid polymer systems. While generally useful for the application of essentially any multicomponent liquid coating to such fibers, it is particularly suitable for solving problems connected with the use of the so-called two-part or two-package coating systems, which for the present purpose are defined as resin systems which are supplied as two or more separate liquid components, and wherein the components react with each other when mixed to provide a cured solid polymer.

A recognition of the variables involved in two-package polymerization and an analysis of the effects of those variables on curing behavior is helpful in understanding the invention. As noted, typical two-package polymer systems normally comprise two separately packaged components, which may be separate resin components or a resin component and a catalyst component. When mixed together, these components chemically react within some curing interval to provide a fully polymerized reaction product in the form of a solid polymer. The curing interval for the mixture (termed the gel point for coating polymers) varies in inverse proportion to the reaction rate for the polymer components, the latter rate increasing with temperature in accordance with an Arrhenius equation of the following form:

$$\ln(k) = \ln(A) - Ea/RT$$

In this equation, k is the rate of reaction, A is a constant which depends upon the composition of the polymer system, Ea is the activation energy for the resin composition, R is the universal gas constant, and T is the absolute temperature. Given an activation energy for a selected polymer system, this equation can be used without knowledge of the preexponential term $\ln(A)$ to determine the minimum conditions of time and temperature under which cure of the resin could be expected to be fully completed.

The activation energies for commercially available polymer systems such as the RTV (room temperature vulcanizing) silicones, aliphatic urethanes, ureas, isocyanurates, and epoxy resins will typically fall in the range of about 8-25 kcal/mole. For specific values within this range of activation energies, and for selected values within the range of useful curing times, the temperatures required to achieve curing of the resin system within the curing time can be determined.

In some cases, the curing times and temperatures indicated by the calculations cannot realistically be achieved, either because of the temperature limitations of the polymers or because of the inherent curing time and temperature limitations of the commercial optical fiber production environment. In other instances, however, the calculations provide a useful guide for the selection of optimum two-package coating systems for optical fiber coating use.

Table I below reports the results of theoretical calculations as described for resins having activation energies in the range of 8-25 kcal/mole. To generate the Table, values are first specified for the activation energy of the resin, the pot life for the resin (corresponding to the curing interval or "gel point" for the polymer at an ambient temperature of 30° C.), and the desired curing interval in a high-temperature curing furnace. Using these values, the temperature needed for full cure of the applied polymer coating within the specified time is calculated.

TABLE I

| Calc. Number | Activation Energy (kcal/mol) | Pot Life (min) | Curing Interval (secs) | Curing Temperature (°C.) |
|---|---|---|---|---|
| 1 | 8 | 10 | 0.05 | 760 |
| 2 | 8 | 5 | 0.05 | 605 |
| 3 | 8 | 0.5 | 0.05 | 311 |
| 4 | 8 | 10 | 0.10 | 605 |
| 5 | 25 | 110 | 0.05 | 150 |
| 6 | 25 | 73 | 0.03 | 150 |
| 7 | 25 | 43 | 0.02 | 150 |
| 8 | 25 | 10 | 0.05 | 118 |
| 9 | 22 | 10 | 0.02 | 150 |
| 10 | 17 | 10 | 0.02 | 200 |

As indicated in the Table, for short curing times, resins exhibiting low activation energies typically require curing at temperatures well above the decomposition temperatures of most organic resin systems. On the other hand, many of the resins nearer the upper range of activation energies exhibit a very desirable combination of extended pot life and rapid curing at temperatures below 250° C.

Based on calculations such as above described, we have determined that two-package systems preferred for high coating and curing rates in accordance with the invention are those having activation energies in the range of about 15-25 kcal/mole. For polymer systems of this type, the necessary resin temperatures for rapid cure, which are typically resin temperatures in the range of 100°-250° C., can readily be achieved in curing furnaces of conventional type and operating in the temperature regime below about 1200° C. For the present purposes, rapid cure is defined as cure at a rate sufficient to achieve standard polymer properties in the applied coating within a time interval not exceeding about 0.5 seconds and preferably in the range of 0.01-0.1 seconds.

While polymer systems having relatively long pot lives have been preferred in the past for the application of two-package coating systems, the method of the invention permits the use of polymer coating systems having very short pot lives because the components of the polymer system are contained in separate delivery systems, and are continuously mixed and applied to the fiber only as needed. Thus even polymer systems with pot lives as short as 5 minutes may be used in accordance with the method of the invention due to the short average dwell times of the mixed coating liquid in the coating application apparatus. In general, the preferred range of pot life (30° gel point) for coating systems used in accordance with the invention will be in the range of about 0.1-2 hours.

Preferred apparatus for a liquid coating supply system for the two-package on-line coating of optical fibers in accordance with the process of the invention is schematically illustrated in FIG. 1 of the drawing. As shown in FIG. 1, liquid Part A of a selected two-package polymer system is drawn from liquid source 10 through supply line 12 into precision positive displacement metering pump 14 and from pump 14 through conduit 16 to input 30 for static mixer 32. At the same time, liquid Part B of the selected polymer system from liquid source 20 is supplied through supply line 22 into precision positive displacement metering pump 24 and from pump 24 through conduit 26 to input 30 for the static mixer 32.

Static mixer 32 operates to thoroughly mix Parts A and B of the polymer system to form a reactive liquid mixture which is continuously supplied through mixer output conduit 34 to coater 40. This polymerizable liquid mixture is applied by coater 40 to optical fiber 2 as drawn from glass preform 1 by drawing means consisting of drawing tractors 90, the product of the coating step being liquid-coated optical fiber 3. Thereafter, liquid-coated optical fiber 3 passes through oven 70 where the liquid coating is thermally cured to produce polymer-coated fiber 4.

For the control of the flow of coating liquid to the fiber coater 40, there are provided in conjunction with precision positive displacement metering pumps 14 and 24 corresponding electronic controllers 50 and 60, respectively. These controllers, which may be conventional controllers such as PID controllers, operate to control the pumping rate of metering pumps 14 and 24 by means of control signals output to the pumps via control signal lines 52 and 62 from the controllers to the pumps as hereinafter more fully described.

Information utilized by the controllers 50 and 60 to set the control signals on lines 52 and 62 to the pumps includes at least one feedback signal based on the actual or calculated rate of coating usage. A variety of different sources for this feedback signal are envisioned; the actual source of feedback information used will of course depend mainly on the type of coater and coating being applied.

In the case of pressure coaters such as described in U.S. Pat. No. 4,531,959, the rate of mixing and supply of the reactive liquid mixture to the coater is most conveniently controlled by feedback from a pressure transducer attached to the coater. Referring again to FIG. 1, as the coating mixture in coater 40 is depleted by application to the fiber, the pressure drop in coater 40 is sensed by a pressure transducer 42 attached to coater 40, and a feedback signal from this transducer is transmitted via signal line 44 to flow controller 50, which is an electronic feedback PID controller.

Also input to controller 50 via signal line 46 is a fluid flow rate signal from metering pump 14. Based on the feedback control signals on lines 44 and 46, flow controller 50 outputs a signal such as a pump motor speed control signal via control line 52 to metering pump 14, thus controlling the flow of Part A liquid through that valve to static mixer 32. By this means, a selected fluid pressure in coater 40 is maintained based on feedback input from pressure transducer 42.

The flow of liquid Part B to the mixer is also preferably controlled by electronic feedback signals, those signals being input to electronic flow controller 60 which controls, via signal line 62, the fluid delivery rate through metering pump 24. The preferred feedback signal in this case, however, is a control signal transmitted via signal line 54 from controller 50 for the Part A liquid component, which signal is preferably varied in accordance with the rate of flow of the Part A component. Thus, since for any selected polymer system the relative proportions of the Part A and Part B liquids are normally fixed, the flow rate for the Part B component is most conveniently controlled by the flow rate of the Part A component.

Alternatively, of course, the coater pressure feedback signal on control line 44 could be directly used by controller 60. Also, controller 60 preferably utilizes as input information a signal proportional to the absolute flow rate of the Part B liquid through metering pump 22, which signal is input to controller 60 via signal line 56 from metering pump 22.

Desirably, static mixer 32 is jacketed so that the temperature of the mixer and liquid therein may be controlled. In the preferred apparatus of FIG. 1, a temperature control fluid such as water may be passed through the jacket via fluid input and output conduits 36 and 38, respectively. Also, as is well known, the temperature of the liquid mixture in coater 40 may be controlled by jacketing or by means of conduits (not shown) provided directly in the coater, such being useful for conducting a temperature control fluid therethrough.

After the liquid coating mixture has been applied to the fiber to form a liquid coating thereon, the liquid coated fiber 2 is passed through conventional curing oven 70 wherein it is rapidly heated to complete the curing reaction. In a preferred arrangement, oven 70 comprises purge gas inlet and outlet ports 72 and 74, respectively, which provide a convenient means for flushing oven 70 and/or maintaining a controlled curing atmosphere therein. Helium is an example of a controlled atmosphere which aids in the conduction of heat to the coating, thereby accelerating the reaction and permitting higher rates of fiber drawing.

The method and apparatus of the invention are of course not limited in their utility to any particular type of polymer system. A variety of different polymers can effectively be used, the main requirement being only that a two-package liquid system for the polymer be available having an appropriate pot life for the coating apparatus used, and having curing characteristics providing rapid polymerization at temperatures below those causing thermal damage to the thin liquid-applied resin coating.

Two-package coating systems are also available commercially which comprise a liquid part and a solid part rather than two liquid parts. These systems can also be used if the solid part can be readily melted, mixed and delivered to the coater in liquid form utilizing the apparatus herein described.

While not limited thereto, specific examples of polymer systems presently available in two-part chemically curing forms which could be used in accordance with the invention are two-package urethane, epoxy, polyimide, and silicone polymers. Also useful are two-package polyurethane foam polymer formulations. Table II below sets forth specific examples of these families of polymers, including a generic designation of resin type and identification of specific commercial products which may be used.

TABLE II

| Polymer Type | Product Designation/Manufacturer |
| --- | --- |
| Polyurethane | Q-thane TM QC 4191 A/B urethane system K. J. Quinn & Co., Inc., Malden, Mass. |
| Polyurethane | Q-thane TM KR 4880 A/B polyurethane system K. J. Quinn & Co., Inc., Malden, Mass. |
| Epoxy | Epo-Tek TM 354 heat-curing epoxy system Epoxy Technology Inc., Billerica, Mass. |
| Polyimide | Matrimide TM 5292 bismaleimide system Ciba-Geigy Corporation, Resins Division Hawthorne, New York |
| Silicone | Sylgard TM 184; Sylgard TM 182 silicone elastomer systems Dow Corning Corp., Midland, Mich. |
| Silicone | RTV-615; RTV-655 silicones General Electric Co., Waterford, NY |
| Polyurethane Foam | Q-thane TM QC-4860 A/B foam polymer system K. J. Quinn & Co., Inc., Malden, Mass. |

The invention may be further understood by reference to the following illustrative example describing the application of a representative polymer coating in accordance therewith.

EXAMPLE 1

A thermally curable two-package silicone elastomer is selected for application as a primary coating to an optical fiber. The silicone selected is a silica-hydride-cured alkene, commercially available as Sylgard ™ 184 silicone elastomer system from the Dow Corning Corporation of Midland, Mich., supplied with a Part A resin component and a Part B resin curing component. These components must be mixed to provide a polymerizable coating liquid curable to an elastomer coating.

The optical fiber to be coated is a glass optical fiber comprising a high-refractive-index glass core, a glass cladding somewhat lower in refractive index than the core, and a thin outer glass layer on the cladding having a relatively high refractive index to optically isolate the fiber cladding from the silicone coating to be applied thereto. The optical fiber has an outer diameter of approximately 125 microns, and all of the glasses making up the optical fiber are of fused silica or doped fused silica composition.

To apply the two-part silicone elastomer coating to this optical fiber as drawn, coating apparatus as described above and in FIG. 1 of the drawing is used. Referring to the drawing, resin Part A from reservoir 10 is fed to the apparatus through supply line 12, while curing agent Part B is fed to the apparatus through supply line 22. In accordance with preferred practice, the higher volume Part A resin component of the two-part polymer system is supplied through metering pump 14, since it is desired to have the flow of the higher volume component metered by that part of the apparatus most directly controlled by downstream feedback (in this case, by controller 50 via the feedback control signal on line 44 in FIG. 1).

During the process of coating the fiber, a coolant liquid is fed through the jacketing of static mixer 32 to maintain the temperature of the mixture of the Part A and Part B components in the mixer at a temperature of approximately 25° C. The coater 40, being a pressure coater of known type as described in U.S. Pat. No. 4,531,959, is also cooled by flowing a coolant through conduits in the body of the coater in conventional fashion, the temperature in the coater block being maintained at about 40° C.

The pumping rates on metering pumps 14 and 24 are adjusted to provide a continuous flow through static mixer 32 and coater 40 sufficient to provide a liquid coating slightly in excess of 50 microns in thickness on the surface of the fiber, thus to achieve an outer diameter for the fiber with cured silicone coating of approximately 230 microns. To insure uniform coating at the specified thickness, the pump motor speed on metering pump 14 is controlled by feedback PID controller 50 using a feedback signal from pressure transducer 42 on the coater transmitted to the controller by signal line 44. The controller is set to permit a flow of Part A component making up approximately 90% of the volume flow needed to maintain the necessary pressure on the coater.

The remaining 10% of volume flow needed for coating liquid replenishment is provided by Part B of the polymer system as supplied through precision metering pump 24. A signal to controller 60 via control line 54 from controller 50 is used by controller 60 to set the motor speed on pump 24 to achieve the proper proportion of volume flow of the Part B component.

Following the application of a uniform liquid coating to the glass optical fiber by the means described, the liquid-coated fiber provided is drawn through a curing furnace to achieve cure of the coating. The furnace is maintained at a temperature of approximately 450° C., and is flushed with helium gas for added heat transfer to the coating. These conditions are effective to assure complete cure of the silicone polymer coating at the point of exit of the fiber from the furnace.

Coated optical fiber produced as described is found to exhibit coating properties well within the range of chemical and physical properties specified for the two-package polymer system employed for coating. Thus the refractive index, elongation, hardness, strength, and chemical durability of the coating are all within normal limits for the RTV silicone polymer used.

In developing metered liquid supply means for effectively controlling the flow rates of liquid components to the mixer in accordance with the invention, alternative devices and/or arrangements for the pumping, flow metering and flow controlling elements of the supply system may readily be envisioned. For example, FIG. 2 of the drawing illustrates an alternative metered liquid supply system, suitable for use wherein the part A liquid component is not pumped but rather supplied by gravity feed or from a pressure tank to conduit 12.

Figure 2:
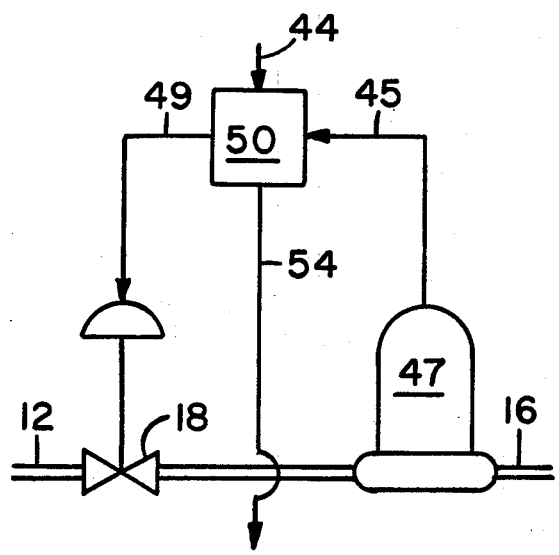
FIG. 2 consists of a schematic illustration of an alternative component liquid flow control arrangement useful in apparatus provided in accordance with the invention.

In the metered liquid supply means of FIG. 2, flow control is achieved by means of flow control valve 18 operating under the control of electronic controller 50. Controller 50 receives feedback information relating to depletion of the polymerizable liquid coating as it is applied to the optical fiber, that information being input to the controller via a signal on feedback signal line 44. As in the apparatus of FIG. 1, this signal may be a signal, for example, from a pressure transducer on the fiber coating device.

Controller 50 also receives information as to the actual flow rate of the flow-controlled liquid component, that information being input to the controller in the form of an electronic signal received via signal line 45 from flow meter 47 for that component.

Based on the signals input on lines 44 and 45, controller 50 outputs a control signal on control line 49 to the flow control valve 18. This control signal is then used by valve 18 to set flow for the flow-controlled liquid component through the flow control apparatus to the mixer. Also, controller 50 can be configured to output a control signal via output signal line 54, which signal could be used as in FIG. 1 for the control of a second component of the polymerizable optical fiber coating liquid.

Alternative coating apparatus may also be effectively used in conjunction with the disclosed coating liquid supply system to provide improved two-package coating application. For example, liquid coaters such as open cup coaters and/or flexible tip coaters may also be continuously supplied with polymerizable coating mixtures from coating reservoirs. For these types of coating devices the coating depletion signal used to control the supply of liquid components of the polymerizable coating liquid to the mixer could, for example, be a liquid level signal from the coating reservoir rather than a liquid pressure signal.

Similarly, control over the ratio of Part A and Part B liquid coating components supplied to the mixer could be by mechanical rather than electronic means. Thus, for example, a single metering pump capable of delivering two liquids or two metered supply pumps operating in tandem at a mechanically fixed flow ratio, the flow ratio being fixed by means of flow restrictors, pump capacity control, or linked pump drive speed control, could alternatively be used.

Figure 3:
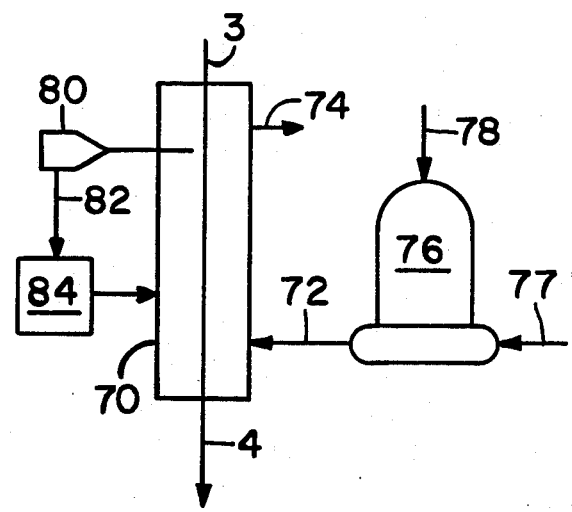
FIG. 3 consists of a schematic illustration of a curing furnace system useful in combination with apparatus provided in accordance with the invention.

The rapid curing of the polymerizable coating liquid applied to the optical fiber is an important aspect of coating application in the commercial environment. FIG. 3 of the drawing schematically illustrates suitable means for controlling curing conditions in a curing furnace such as furnace 70 of in FIG. 1 to achieve this result.

For control of the heat transfer characteristics of the atmosphere in furnace 70, FIG. 3 shows apparatus for the supply of helium gas to the furnace from a helium source, not shown, which may for example be a tank of compressed helium. This gas is supplied to a flow controller 76 via conduit 77 from the tank or other source, and through the flow controller 76 to furnace 70 via gas inlet 72. An externally supplied set point voltage signal is applied to flow controller 76 at input line 78 to set the controller flow rate for the helium based on the curing environment selected for the two-part polymer being cured.

As also shown in FIG. 3, furnace 70 may be provided with thermocouple 80, the voltage signal from which is transmitted via signal line 82 to furnace power controller 84. Thus the heat energy supplied to furnace 70 is controlled to maintain a preselected optimum temperature therein for the two-part polymer being cured.

Of course the foregoing examples and descriptions are merely illustrative of compositions, processes and apparatus which may be employed in the practice of the invention, and thus numerous variations and modifications of the embodiments specifically disclosed herein may be employed by those skilled in the art within the scope of the appended claims.

We claim:

1. In the method for coating an optical fiber with a protective polymer coating wherein a polymerizable coating liquid is applied to the fiber surface by a liquid coater as the fiber is drawn from a glass melt or preform and before the fiber contacts a solid surface, the polymerizable coating liquid comprising a mixture of at least first and second liquid components combinable to form a solid coating, the improvement wherein:

the first and second liquid components are continuously combined and mixed together to form the polymerizable coating liquid as the fiber is drawn; and the polymerizable coating liquid is supplied to the liquid coater at a rate corresponding to the rate of application of the polymerizable coating to the fiber surface.

2. A method in accordance with claim 1 wherein the first and second liquid components are reactive with respect to each other to form a solid polymer coating.

3. A method in accordance with claim 2 wherein the rate at which the first and second liquid components are mixed and supplied as polymerizable coating liquid to the coater is controlled by at least one electronic feedback signal corresponding to an actual or calculated rate of application of the polymerizable coating liquid to the optical fiber.

4. A method in accordance with claim 3 wherein the coater includes a liquid pressure coating die, and wherein the electronic feedback signal is a signal based on the pressure of the polymerizable coating liquid in the pressure coating die.

5. A method in accordance with claim 3 wherein the coater includes a reservoir for the polymerizable coating liquid and wherein the electronic feedback signal is a signal based on the level of polymerizable coating liquid in the reservoir.

6. A method in accordance with claim 2 wherein the first and second liquid components are components of a two-package polymer system having an activation energy for polymerization in the range of about 15-25 kcal/mole.

7. A method in accordance with claim 6 which comprises the additional step, following application of the polymerizable coating liquid to the fiber, of curing the applied coating by heating it to a temperature in the range of 100°-250° C. for a time interval in the range of about 0.01-0.5 seconds.

8. A method in accordance with claim 7 wherein curing is carried out in a helium atmosphere in a curing furnace operated at a temperature not exceeding 1200° C.

9. A method in accordance with claim 2 wherein the first and second liquid components are components of a two-package polymer system selected from the group consisting of two-package urethane, epoxy, polyimide, silicone, and polyurethane foam systems.

10. A method in accordance with claim 9 wherein the polymer system has a pot life at 30° C. in the range of about 0.1-2 hours.

11. A method in accordance with claim 9 wherein the two-package polymer system is a silicone elastomer system.

12. A method in accordance with claim 1 wherein the optical fiber is drawn and coated at a fiber drawing rate in excess of 10 meters per second.

13. In apparatus for the manufacture of a polymer-coated glass optical fiber comprising drawing means for drawing the fiber from a glass melt or preform and a liquid coater positioned between the drawing means and the glass melt or preform for applying to the surface of the fiber as drawn a polymerizable coating liquid, the improvement wherein the apparatus includes a supply system for the polymerizable coating liquid comprising, in combination:

a liquid mixer having a liquid output connected to an input for the polymerizable coating liquid on the coater;

liquid input means on the liquid mixer for at least first and second liquid polymer components to be combined to form the polymerizable coating liquid;

first and second metered liquid supply means for first and second liquid polymer components, respectively, each of the first and second metered liquid supply means being connected to the liquid input means and being adapted to continuously supply metered proportions of the first and second liquid components to the liquid mixer, at least one of the metered liquid supply means further including feedback signal input means for controlling liquid supply therefrom;

sensing means positioned at or between at least one of the liquid supply means and the liquid coater, the sensing means being adapted to sense depletion of the polymerizable coating liquid as it is applied by the coater to the optical fiber and having a signal output adapted to generate a depletion signal in response to the depletion of the polymerizable coating liquid; and signal transmission means for conveying the depletion signal from the signal output of the sensing means to the feedback signal input means on at least one of the first and second metered liquid supply means, the feedback signal being utilized by the metered liquid supply means to control liquid supply therefrom;

whereby the continuous flow of liquid polymer components to the liquid mixer and liquid coater is controlled by the rate of depletion of the polymerizable coating liquid as it is applied by the coater to the optical fiber.

14. Apparatus in accordance with, claim 13 wherein the liquid mixer is a temperature-controlled static mixer.

15. Apparatus in accordance with claim 13 wherein at least one of the first and second metered liquid supply means comprises a precision positive displacement metering pump.

16. Apparatus in accordance with claim 15 wherein the metered liquid supply means further comprises a programmable electronic controller electrically connected to the precision positive displacement pump and adapted to control the rate of delivery of component liquid therethrough.

17. Apparatus in accordance with claim 16 wherein the precision positive displacement pump is controlled by a pump motor speed control signal from the programmable electronic controller.

18. Apparatus in accordance with claim 13 wherein at least one of the first and second metered liquid supply means comprises an electronically controlled liquid flow control valve.

19. Apparatus in accordance with claim 18 which further comprises a programmable electronic controller electronically connected to the liquid flow control valve and adapted to control the rate of delivery of component liquid therethrough.

20. Apparatus in accordance with claim 13 wherein the sensing means comprises a sensor for liquid pressure or liquid level in the liquid coater.

21. Apparatus in accordance with claim 20 wherein the coater comprises a liquid pressure coating die and wherein the sensing means comprises a liquid pressure transducer in physical contact with the polymerizable coating liquid in the liquid pressure coating die.

22. Apparatus in accordance with claim 21 wherein the depletion signal is a signal output by the liquid pressure transducer, the signal being proportional to the pressure of the polymerizable coating liquid in the pressure coating die.

23. Apparatus in accordance with claim 13 wherein the first and second metered liquid supply means comprise first and second precision positive displacement metering pumps adapted to deliver the first and second liquid polymer components to the liquid mixer in a selected fixed proportion.

24. Apparatus in accordance with claim 13 wherein the first and second metered liquid supply means comprise a single pumping unit adapted to separately deliver flows of the first and second liquid polymer components to the liquid mixer in a selected fixed proportion.

* * * * *